US008271174B2

(12) United States Patent
Okada et al.

(10) Patent No.: US 8,271,174 B2
(45) Date of Patent: Sep. 18, 2012

(54) SUPPORT CONTROL DEVICE (75) Inventors: Kiyokazu Okada, Nishikamo-gun (JP);
Motohiro Nakamura, Okazaki (JP);
Hidenobu Suzuki, Ann Arbor, MI (US);
Masaki Nakamura, Okazaki (JP);
Makoto Hasunuma, Nagoya (JP)

(73) Assignees: Toyota Jidosha Kabushiki Kaisha,
Toyota-shi (JP); Aisin Aw Co., Ltd.,
Anjyo-shi (JP)

( * ) Notice: Subject to any disclaimer, the term of this patent is extended or adjusted under 35 U.S.C. 154(b) by 769 days.

(21) Appl. No.: 12/300,737

(22) PCT Filed: May 15, 2007

(86) PCT No.: PCT/JP2007/059977
§ 371 (c)(1),
(2), (4) Date: Apr. 29, 2009

(87) PCT Pub. No.: WO2007/132858
PCT Pub. Date: Nov. 22, 2007

(65) Prior Publication Data
US 2009/0265070 A1 Oct. 22, 2009

(30) Foreign Application Priority Data
May 15, 2006 (JP) ................................ 2006-135792

(51) Int. Cl.
*G08G 1/16* (2006.01)
(52) U.S. Cl. ............................................. 701/70; 701/1

(58) Field of Classification Search ................. 701/1, 70, 701/300–302, 93, 96, 701, 15; 340/901, 340/903, 425.5, 435–436
See application file for complete search history.

(56) References Cited

U.S. PATENT DOCUMENTS

| 4,258,351 A * | 3/1981 | Shigeta et al. ................ 340/942 |
| 4,433,325 A * | 2/1984 | Tanaka et al. ................. 340/937 |
| 5,166,681 A * | 11/1992 | Bottesch et al. ............. 340/933 |
| 6,141,617 A | 10/2000 | Matsuda et al. |
| 6,199,001 B1 | 3/2001 | Ohta et al. |
| 2004/0102900 A1 | 5/2004 | Ibrahim et al. |
| 2006/0028832 A1 | 2/2006 | Horii et al. |
| 2009/0299857 A1 * | 12/2009 | Brubaker ................... 705/14.66 |

FOREIGN PATENT DOCUMENTS
EP 1 085 296 A2 3/2001
(Continued)

OTHER PUBLICATIONS

Extended Search Report issued Nov. 23, 2010 in EP Application No. 07743412.4.

Primary Examiner — Yonel Beaulieu
(74) Attorney, Agent, or Firm — Oblon, Spivak, McClelland, Maier & Neustadt, L.L.P.

(57) ABSTRACT

An accuracy error for measuring the position of an own vehicle is calculated based on the information of an execution history of map matching and the information of an update history of a map database. In addition, a predetermined map is referred to based on the calculated accuracy error, and an accuracy error level for performing positioning is specified from among plural stepwise levels. Then, the control level of assist control executed according to the position of the own vehicle is changed so as to correspond to the specified accuracy error level.

17 Claims, 4 Drawing Sheets

FOREIGN PATENT DOCUMENTS

| | | |
|---|---|---|
| EP | 1 085 296 A3 | 3/2001 |
| JP | 6 341849 | 12/1994 |
| JP | 2000 161975 | 6/2000 |
| JP | 2004 351994 | 12/2004 |
| JP | 2005 77211 | 3/2005 |
| JP | 2005 147713 | 6/2005 |
| JP | 2006 69521 | 3/2006 |
| JP | 2007 1475 | 1/2007 |
| JP | 2007 196776 | 8/2007 |
| WO | 2007 040069 | 4/2007 |

* cited by examiner

SUPPORT CONTROL DEVICE

TECHNICAL FIELD

The present invention relates to assist control devices and, in particular, to an assist control device suitable for executing assist control according to the position of an object such as a vehicle, which is measured, for example, by map matching or the like.

BACKGROUND ART

Known devices calculate positioning accuracy for measuring the present position of an object such as a vehicle and inform the user of the calculated positioning accuracy (see, for example, Patent Document 1). The positioning accuracy is likely to fluctuate due to, for example, an error in detection results (such as the yaw angle and the speed of the vehicle) from a sensor used for measuring the present position of the object and to an error caused when map data themselves are not updated. Thus, according to the configuration of the above devices, it is possible to appropriately inform the vehicle driver of the change of the positioning accuracy to avoid the misidentification of the position of the vehicle or the like.
Patent Document 1: JP-A-2005-77211

DISCLOSURE OF INVENTION

Problems to be Solved by the Invention

Typically, a vehicle has generally installed therein an assist control device that performs assist control such as route guidance and driving assist by identifying a present position with map data. An example of the assist control does not require high positioning accuracy as seen in the route guidance using, for example, an audio output with respect to the present position of a vehicle. On the other hand, another example of the assist control requires high positioning accuracy as seen in the driving assist that automatically performs a brake operation and a steering operation, for example, at an intersection.

According to the calculated positioning accuracy, the above known device determines the necessity of executing the assist control. That is, the device usually executes the assist control (specifically, it informs the present position of the vehicle through an audio message) if the calculated positioning accuracy is greater than or equal to a predetermined value and stops the assist control if the calculated positioning accuracy is less than the predetermined value. However, even if the calculated positioning accuracy is only compared with a uniformly fixed threshold to determine the necessity of executing the assist control in a binary manner, the assist control may not provide detailed and appropriate assist for the vehicle driver.

The present invention has been made in view of the above points and has an object of providing an assist control device capable of appropriately executing assist control executed according to the position of an object so as to correspond to error accuracy when a position is measured.

Means for Solving the Problems

The above object is attained by an assist control device comprising accuracy error calculation means that calculates an accuracy error for measuring the position of an object; and control level change means that changes the control level of assist control executed according to the position of the object so as to correspond to the accuracy error calculated by the accuracy error calculation means.

According to an aspect of the invention, the control level of the assist control executed according to the position of the object is changed so as to correspond to the accuracy error for measuring the position of the object. With this configuration, the assist control can be executed at the control level corresponding to the positioning accuracy error among plural stepwise control levels. Therefore, it is possible to appropriately execute the assist control so as to correspond to the accuracy error.

In this case, in the assist control device, the assist control may have plural assist modes corresponding to the control level.

Furthermore, in the assist control device, the control level change means may expedite execution start timing of the assist control when the accuracy error calculated by the accuracy error calculation means is larger. Accordingly, even if the positioning accuracy is low and the measured position of the object is greatly deviated from a correct position of the object, it is possible to prevent an unexpected situation with the assist control executed according to the position of the object that may have a large accuracy error.

Note that in the assist control device, the assist control may perform driving assist that causes an own vehicle to stop at a stop position or perform driving assist that prevents an own vehicle from colliding into a crossing vehicle.

Moreover, in the assist control device, the accuracy error calculation means may calculates the accuracy error based on an update history of positioning information about the measuring of the position of the object.

In this case, in the assist control device, the positioning information may be a map database that stores map data, and it may be the position of the object obtained by map matching.

Advantage of the Invention

According to the present invention, it is possible to appropriately execute assist control according to the position of an object so as to correspond to error accuracy when the position is measured.

EXPLANATION FOR REFERENCE NUMBER

10 assist control device
12 positioning unit
14 assist control unit
30 map database
36 present position management unit
38 error level determination unit
40 ECU
52 patterns storage unit Best Mode for Carrying out the Invention Hereinafter, a preferred embodiment of the present invention is described.

Figure 1:
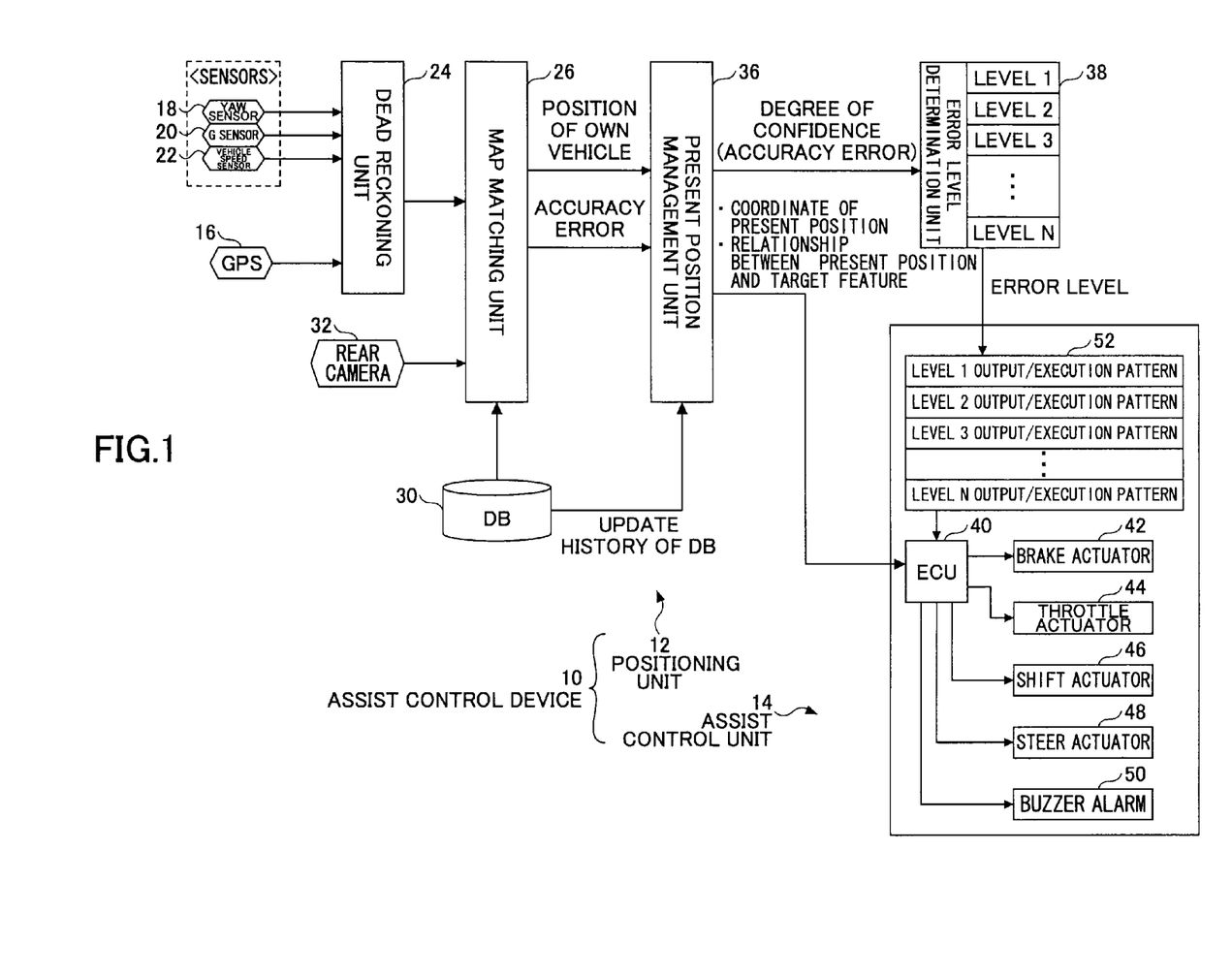
FIG. 1 shows a configuration diagram of an assist control device installed in a vehicle as an example of the present invention.

FIG. 1 shows a configuration diagram of an assist control device 10 installed in a vehicle as an example of the present invention. As shown in FIG. 1, the assist control device 10 of this embodiment has a positioning unit 12 that measures the position of an own vehicle and an assist control unit 14 that controls the driving or the like of the own vehicle. The assist control device 10 is a system that executes predetermined assist control for driving the own vehicle with the assist control unit 14 according to the position of the own vehicle of which an accuracy error measured by the positioning unit 12 could fluctuate. Note that this assist control may be started, for example, when a vehicle driver turns on a switch for allowing the execution of its control after performing an ignition-on operation.

The positioning unit 12 has a GPS (Global Positioning System) receiver 16, a yaw sensor 18, a G sensor 20, and a vehicle speed sensor 22. The GPS receiver 16 detects the latitude and longitude of the present position of the own vehicle on earth and a present time by receiving a GPS signal transmitted from a GPS satellite. The yaw sensor 18 is a geomagnetic sensor or a gyro sensor, which detects the yaw angle (direction) of the own vehicle. The G sensor 20 detects anteroposterior acceleration and deceleration speeds of the own vehicle. Furthermore, the vehicle speed sensor 22 detects the speed of the own vehicle.

The outputs of the GPS receiver 16, the yaw sensor 18, the G sensor 20, and the vehicle speed sensor 22 are connected to a dead reckoning unit 24 constituted mainly of a microcomputer. Output signals from the receiver and the sensors 16 through 22 are each supplied to the dead reckoning unit 24. The dead reckoning unit 24 detects the latitude and longitude (initial coordinate) of the present position of the own vehicle based on information from the GPS receiver 16 and then generates the driving locus (reckoning locus) of the position of the own vehicle from the initial coordinate by detecting driving statuses such as the traveling direction of the own vehicle based on information from the sensors 18 through 22.

The positioning unit 12 also has a map matching unit 26 that is connected to the dead reckoning unit 24 and constituted mainly of a microcomputer, and it has a map database 30 that is connected to the map matching unit 26. The map database 30 is in the form of a hard disk (HDD), a DVD, a CD, or the like installed in the vehicle and stores various map data such as the link information of roads themselves and the information of features and traffic lanes drawn or provided on the roads.

Note that the map data stored in the map database 30 include the data of lane shapes and road types representing the roads such as latitudes and longitudes, curvatures, slopes, the number of lanes, lane widths, and the presence or absence of corners; and the data of shapes and colors for each of the features, positions, and distances between the features, all of which are drawn on the surfaces of the roads, such as crosswalks, temporary stop lines, traveling direction arrows, diamond signs indicating the presence of "crosswalks," maximum speed signs, and turnaround prohibition signs. Furthermore, the map data stored in the map database 30 can be updated when disks are replaced or update conditions are met.

The information of the reckoning locus about the position of the own vehicle from the initial coordinate is generated by the dead reckoning unit 24 for map matching, and then it is supplied to the map matching unit 26. Every time the information of the reckoning locus is supplied from the dead reckoning unit 24, the map matching unit 26 performs the map matching in which the present position of the own vehicle is corrected on the links of the roads by the use of the link information of the roads themselves stored in the map database 30.

The map matching unit 26 reads from the map database 30 the map data within a road range where the own vehicle is expected to drive in a predetermined time or in a predetermined distance, determining from the present position of the own vehicle based on the results of the map matching. Then, the map matching unit 26 examines whether there is any feature to be recognized, drawn or provided within the predetermined road range from the present position and determines the necessity of recognizing an image picked up by a rear camera described below.

The positioning unit 12 also has a rear camera 32 connected to the map matching unit 26. The rear camera 32 is disposed in a bumper or the like at the rear of the vehicle and can pick up an image of the outside including the surfaces of the roads in a predetermined area behind the vehicle from its disposed position. The image picked up by the rear camera 32 is supplied to the map matching unit 26.

When the map matching unit 26 receives the image from the rear camera 32 after having determined the necessity of recognizing the image picked up by the rear camera 32, it applies image processing such as edge extraction to the image, thereby detecting the above features drawn on the surface of the road and the driving lane and identifying a relative positional relationship between the features or the like and the own vehicle. Note that when the map matching unit 26 detects the features and the driving lane, it may apply, for the purpose of increasing its efficiency, the image processing to the image after identifying the area of the road where the features or the like are present based on the characteristic data of the features or the like provided by the map matching unit 26 and then intensively focusing the presence area of the features or the like with respect to all the images picked up by the rear camera 32.

Based on the detection result of the driving lane from the image picked up by the rear camera 32, the map matching unit 26 calculates the position of a self lane relative to the own vehicle on the road where the own vehicle is actually driving. In addition, the map matching unit 26 measures a relative relationship between the own vehicle and the feature recognized to be present behind the own vehicle on the road (specifically, a distance from the own vehicle to the recognized feature) based on the detection result of the feature, and then it detects the position of the own vehicle based on the measurement result and the position data of the recognized feature stored in the map database 30.

As described above, every time the information of the reckoning locus is supplied from the dead reckoning unit 24, the map matching unit 26 performs the map matching in which the present position of the own vehicle is corrected on the links of the roads stored in the map database 30. In addition, when the feature to be recognized is recognized from the image picked up by the rear camera 32, the map matching unit 26 also performs the map matching in which the position of the own vehicle is corrected on the position according to the recognition result. As described in detail below, the map matching unit 26 calculates correctness (namely, the degree of confidence) representing accuracy in the present position of the own vehicle measured by the map matching.

After measuring the position of the own vehicle with the map matching, the map matching unit 26 calculates, if there is a target feature (such as a stop line, an intersection, and a curve entrance) as a control object required for executing the above assist control ahead of the own vehicle in the traveling direction, a distance from the own vehicle to the target feature (hereinafter referred to as a remaining distance along the road) based on a relationship between the measured position of the own vehicle and the position of the target feature stored in the map database 30.

The positioning unit 12 also has a present position management unit 36 connected to the map matching unit 26. The present position management unit 36 receives, together with the information of a time obtained, the link ID and link coordinate of the present position of the own vehicle obtained by the map matching calculated in the map matching unit 26; the information of the degree of confidence representing the accuracy in the present position of the own vehicle; the information of the driving lane on the road where the own vehicle is actually driving; and the information of the remaining distance along the road from the own vehicle to the target feature. The present position management unit 36 also receives the information of an update history such as an elapsed time and update conditions after the update of the map data in the map database 30.

Based on the information supplied from the map matching unit 26, the present position management unit 36 detects the measured present position of the own vehicle and the remaining distance along the road from the own vehicle to the target feature as well as an error in accuracy representing the degree of confidence of the measured present position of the own vehicle. The information of the present position of the own vehicle and the remaining distance along the road detected by the present position management unit 36 is supplied, for example, to a navigation system of the own vehicle and then schematically displayed on the map displayed on its screen.

The assist control unit 10 has an error level determination unit 38 connected to the present position management unit 36. The error level determination unit 38 receives information representing a position accuracy error for measuring the present position of the own vehicle detected and managed by the present position management unit 36. The error level determination unit 38 has, in advance, a map of a relationship between the position accuracy error for measuring the present position of the own vehicle and a positioning accuracy error level required for appropriately executing the assist control by the assist control unit 14 at respective control levels described below. The error level determination unit 38 specifies the accuracy error level as occasion demands based on the information of the position accuracy error, which is supplied from the present position management unit 36 and used for measuring the present position of the own vehicle in the positioning unit 12. Note that as the accuracy error level, the one having plural stepwise levels corresponding to the sizes of the position accuracy errors (level 1 through level n) can be used.

The information of the determination results by the error level determination unit 38, the coordinates of the present position of the own vehicle measured by the present position management unit 36, and the relationship between the own vehicle and the target feature is supplied to the assist control unit 14. The assist control unit 14 has an electronic control unit (ECU) 40 constituted mainly of a microcomputer, which executes the assist control when the driver drives the own vehicle on the road.

This assist control is executed according to the position of the own vehicle. Examples of this assist control include temporary stop control as driving assist control that causes the own vehicle to stop at a temporary stop line, a crossing, or the like as the feature on the road particularly when the brake operation of the driver is not performed or delayed; intersection control as the driving assist control that prevents the own vehicle from colliding into other vehicles expected to collide into each other at an intersection as the feature on the road; speed control that causes the own vehicle to enter a curve (corner) as the feature at appropriate speed; and guidance control for performing route guidance through an audio message with respect to a relative distance to the target feature.

The ECU 40 is connected to a brake actuator 42 that generates an appropriate braking force in the own vehicle; a throttle actuator 44 that imparts an appropriate driving force to the own vehicle; a shift actuator 46 that switches a variable speed of the automatic transmission of the own vehicle; a steer actuator 48 that imparts an appropriate steering angle to the own vehicle; and a buzzer alarm 50 that performs buzzer sounding, an alarm output, and a speaker output toward the inside of the vehicle. As described in detail below, the ECU 40 issues an appropriate driving instruction to each of the actuators 42 through 50 based on the measured present position of the own vehicle managed by the present position management unit 36, the accuracy error level specified by the error level determination unit 38, or the like. Each of the actuators 42 through 50 is driven according to the driving instruction issued from the ECU 40.

The assist control unit 14 also has a patterns storage unit 52 that stores the information of output/execution patterns used when the ECU 40 executes the assist control. The output/execution patterns are specified for each assist control. The patterns storage unit 52 stores the output/execution patterns (level 1 through level n) as plural assist modes (control levels) corresponding to the plural stepwise accuracy error levels specified by the error level determination unit 38 for each assist control.

For example, as for the temporary stop control that causes the own vehicle to stop at the temporary stop line or the like as described above, the patterns storage unit 52 stores, in the order in which the positioning accuracy is high and the positioning accuracy error is small, an avoidance control pattern (level 1) that causes the own vehicle to automatically brake using mainly the brake actuator 42 to stop at the temporary stop line or the like; a speed reduction control pattern (level 2) that automatically releases the accelerator of the own vehicle to reduce speed before the temporary stop line or the like or actuates an engine brake using the shift actuator 46 and also generates a larger braking force than usual in the own vehicle when the driver performs a brake operation; a determination auxiliary pattern (level 3) that urges the driver to perform a brake operation to stop the own vehicle at the temporary stop line or the like ahead of the vehicle using the buzzer alarm 50; and a presence information provision pattern (level 4) that causes the driver to call attention to the presence of the temporary stop line or the like ahead of the vehicle using the buzzer alarm 50.

In addition, as for the intersection control that prevents the own vehicle from colliding into other vehicles at the intersection on the road as described above, the patterns storage unit 52 stores an avoidance control pattern (level 1) that causes the own vehicle to automatically brake or steer using mainly the brake actuator 42 and the steer actuator 48 to avoid colliding into other vehicles at the intersection; a speed reduction control pattern (level 2) that automatically releases the accelerator of the own vehicle to reduce speed before the intersection or actuates an engine brake using the shift actuator 46 and also generates a larger braking force than usual in the own vehicle when the driver performs a brake operation; a determination auxiliary pattern (level 3) that urges the driver to perform a brake operation to reduce speed or stop the own vehicle at the intersection ahead of the vehicle using the buzzer alarm 50; and a presence information provision pattern (level 4) that causes the driver to call attention to the possibility of colliding into other vehicles at the intersection ahead of the vehicle using the buzzer alarm 50.

Moreover, as for the guidance control that performs the route guidance through an audio message with respect to a relative distance to the target feature (for example, a right-turn intersection) as described above, the patterns storage unit 52 stores a pattern (level 1) that informs the driver of the presence of the target feature immediately before (for example, five meters before) the own vehicle reaches the target feature; a pattern (level 2) that informs the driver of the presence of the target feature at a second predetermined distance (for example, 10 meters before) where the own vehicle reaches the target feature; a pattern (level 3) that informs the driver of the presence of the target feature at a third predetermined distance (for example, 40 meters before) where the own vehicle reaches the target feature; and a pattern (level 4) that informs the driver of the presence of the target feature at a fourth predetermined distance (for example, 80 meters before) where the own vehicle reaches the target feature.

Each of the assist modes of the assist control has execution start timing (preferred to be changed according to vehicle speed) of the control in advance. Compared with the execution of the assist mode corresponding to a small error, the execution of the assist mode corresponding to a large error is started when the distance between the measured position of the own vehicle and the target feature as a control object is long. In other words, it is started at an earlier timing when the own vehicle approaches the target feature.

For example, in a situation in which the temporary stop control is executed, the call attention by the assist mode under the presence information provision pattern (level 4) is started when the measured distance to the target feature is 100 meters long while the vehicle drives at a certain vehicle speed. On the other hand, the braking by the assist mode under the avoidance control pattern (level 1) is started when the measured distance to the target feature is 30 meters long while the vehicle drives at the certain vehicle speed. Furthermore, in a situation in which the guidance control is executed for performing the route guidance through an audio message with respect to a relative distance to the target feature (for example, a right-turn intersection), the audio guidance by the assist mode under level 4 is started when the measured distance to the target feature is 80 meters long while the vehicle drives at a certain vehicle speed. On the other hand, the audio guidance by the assist mode under level 1 is started when the measured distance to the target feature is five meters long while the vehicle drives at the certain vehicle speed.

Figure 2:
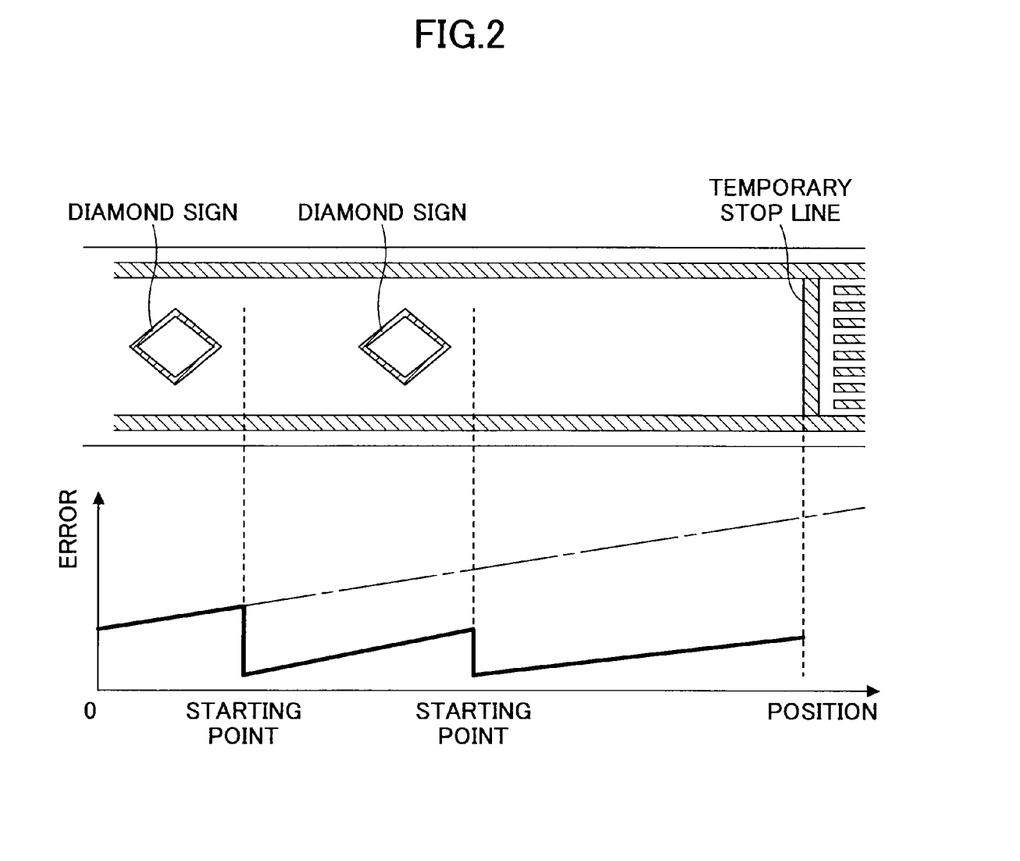
FIG. 2 is a diagram showing a relationship between an accuracy error and a driving position when the present position of the vehicle is measured.
Figure 3:
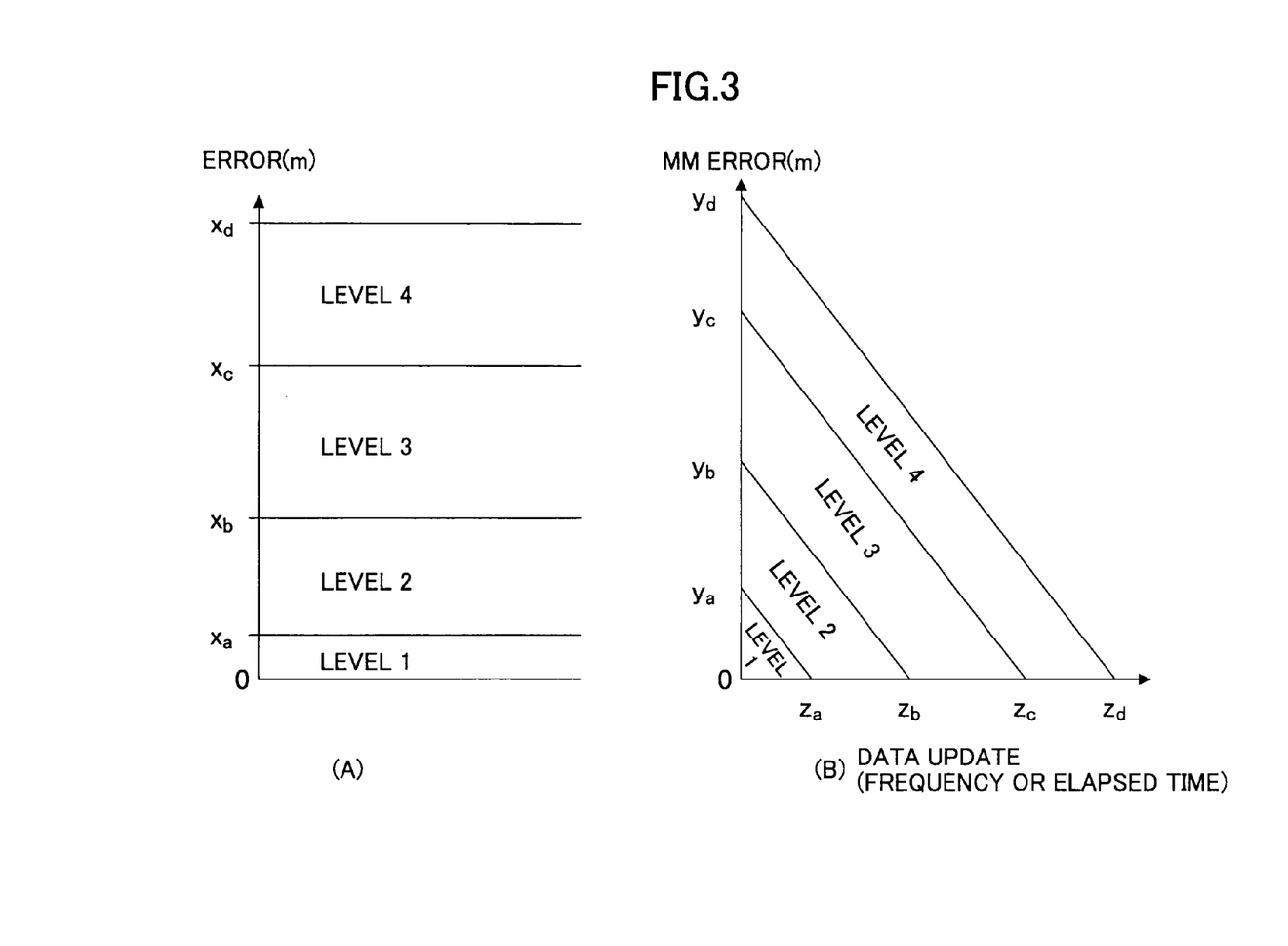
FIGS. 3A and 3B are diagrams showing a relationship between a positioning accuracy error used in the assist control device of this embodiment and an accuracy error level required when each control level of the assist control is appropriately executed.
Figure 4:
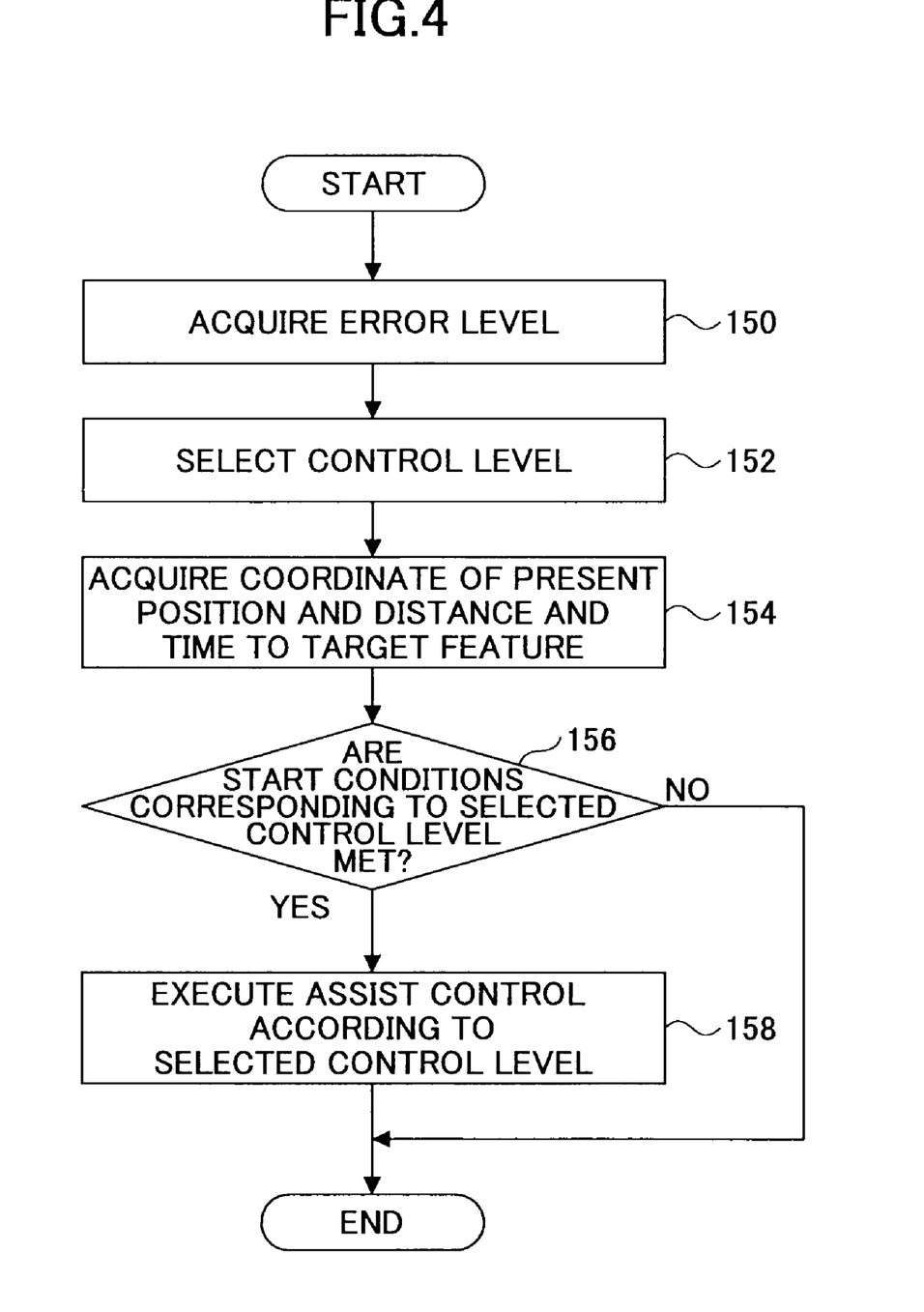
FIG. 4 is a flowchart showing an example of a control routine executed by the assist control unit in the assist control device of this embodiment.

Next, referring to FIGS. 2 through 4, a description is made of operations in the system of this embodiment. FIG. 2 is a diagram showing a relationship between an accuracy error and a driving position when the present position of a vehicle is measured. FIGS. 3A and 3B are diagrams showing a relationship between a positioning accuracy error used in the assist control device 10 of this embodiment and its accuracy error level. Furthermore, FIG. 4 is a flowchart showing an example of a control routine executed by the assist control unit 14 in the assist control device 10 of this embodiment.

In the assist control device 10 of this embodiment, the dead reckoning unit 24 of the positioning unit 12 generates the driving locus of the position of the own vehicle from an initial coordinate based on output signals from the receiver and the sensors 16 through 22 with a predetermined time interval and supplies the generated driving locus to the map matching unit 26. Every time the map matching unit 26 receives the information of the reckoning locus from the dead reckoning unit 24, it performs the map matching, in which the present position of the own vehicle is corrected on the links of roads, by identifying the driving locus of the position of the own vehicle from the initial coordinate generated by the dead reckoning unit 24 with the link information of the roads stored in the map database 30 as map data.

The map matching unit 26 reads from the map database 30 the map data within a road range (all lanes if the road has plural lanes) where the own vehicle is expected to drive in a predetermined time or in a predetermined distance, determining from the present position of the own vehicle based on the results of the map matching. Then, the map matching unit 26 examines whether there is any feature to be recognized by the rear camera 32 in the predetermined road range and determines the necessity of identifying an image behind the vehicle using the rear camera 32. Note that the present position of the own vehicle detected by the map matching may be incorrect. Therefore, based on the presence or absence of any feature to be recognized in the predetermined road range from the present position, the map matching unit 26 determines the necessity of recognizing the image from behind the position of the feature to be recognized.

If the map matching unit 26 determines that there is no feature to be recognized in the predetermined road range, it does not perform any processing. On the other hand, if the map matching unit 26 determines that there is any feature to be recognized in the predetermined road range, it applies image processing such as edge extraction to an image picked up by the rear camera 32 to thereby extract the feature from the image picked up by the camera based on the results of the image processing and then detects a relative positional relationship between the feature and the own vehicle. After that, the map matching unit 26 accesses the map database 30 to read the position data of the recognized feature and then detects the position of the own vehicle based on the position data and the detected relative positional relationship between the own vehicle and the recognized feature. In this case, the position of the own vehicle is map-matched on the position according to the feature recognized from the image picked up by the camera.

In addition, if the map matching unit 26 determines that there is any feature to be recognized in the predetermined road range, it extracts a self lane where the own vehicle is actually driving from the image picked up by the camera based on the results of the image processing by the rear camera 32 and then detects a relative positional relationship between the self lane and the own vehicle. On this occasion, the map matching unit 26 accesses the map database 30 to acquire the lane width, the number of lanes, the shapes, or the like of the driving lane in the vicinity of the position of the own vehicle and then calculates the position of the self lane on the road where the own vehicle is actually driving.

After measuring the position of the own vehicle and calculating the position of the self lane on the road, the map matching unit 26 determines whether there is any target feature required for executing the assist control on the self lane ahead of the own vehicle in the traveling direction. If the map matching unit 26 determines that there is any target feature, it reads the position data of the target feature from the map database 30 and then calculates the remaining distance along the road from the own vehicle to the target feature based on a relationship between the detected position of the own vehicle and the position of the target feature. The map matching unit 26 supplies and outputs the information of the remaining distance along the road together with time information to the present position management unit 36. Furthermore, every time the map matching unit 26 measures the position of the own vehicle, it calculates an accuracy error in the present position of the own vehicle measured at that point. Then, the map matching unit 26 supplies and outputs the information of the measured present position of the own vehicle and the information of its accuracy error together with time information to the present position management unit 36.

The present position management unit 36 detects the present position of the own vehicle and the remaining distance along the road calculated by the map matching unit 26 and then transmits the information of the coordinates of the present position of the own vehicle, the distance to the target feature, the time, or the like to the ECU 40 of the assist control device 14. Also, the present position management unit 36 calculates the comprehensive positioning accuracy error in the present position of the own vehicle based on the information of the position accuracy error from the map matching unit 26 (namely, the execution history of the map matching) and the information of the update history of map data from the map database 30, and then it transmits the accuracy error to the error level determination unit 38. Note that the present position management unit 36 may separately calculate the positioning accuracy error based on the execution history of the map matching and the accuracy error in the positioning results based on the update history of the map database 30 and may transmit them to the error level determination unit 38.

Meanwhile, when the present position of the vehicle is measured according to this embodiment, the GPS receiver 16, the yaw sensor 18, the G sensor 20, the vehicle speed sensor 22, and the rear camera 32 are used. On this occasion, errors in detection parameters of the receiver 16 and the sensors 18 through 22, errors in various calculations (for example, the rounding error of timing) when the receiver 16 and the sensors 18 through 22 measure the present position of the vehicle, etc., are caused. Therefore, an error is caused in the results of measuring the position of the vehicle. This positioning error is accumulated as the vehicle moves. According to this embodiment, on the other hand, the measuring unit 12 performs the map matching in which the feature to be recognized is recognized from the image picked up by the rear camera 32 to correct the position of the own vehicle. As a result of the map matching, the position accuracy in the measured present position of the own vehicle becomes the highest, and the positioning accuracy error becomes the smallest. Accordingly, the longer the movement distance of the vehicle after the measuring unit 12 performs the map matching based on the recognition of the feature from the image picked up by the rear camera is, the larger the positioning error becomes (see FIG. 2).

In addition, according to this embodiment, the position of the own vehicle is measured by the use of updatable map data stored in the map database 30. However, if an elapsed time after the update of the map database 30 becomes longer, the map data stored in the map database 30 may be different from a reality due to the renovation, new construction, or the like of roads. Therefore, the positioning error in the position of the own vehicle may fluctuate according to the update conditions, update frequency, elapsed time, and movement distance of the map database 30 after a previous update. Specifically, the longer the elapsed time and the movement distance after the update of the map database 30 is or the harder the update of the update conditions or the like is, the larger the positioning error becomes.

The present position management unit 36 calculates the positioning accuracy error in the present position of the own vehicle based on the movement distance of the vehicle after the map matching based on the recognition of the feature from the image picked up by the rear camera, which is supplied from the map matching unit 26, and based on the update conditions and update frequency or the elapsed time and movement distance of the map data supplied from the map database 30 after the previous update, and then it transmits the calculated positioning accuracy error in the present position of the own vehicle to the error level determination unit 38.

Based on the positioning accuracy error in the position of the own vehicle from the present position management unit 36, the error level determination unit 38 specifies the accuracy error level for performing the positioning by referring to the maps as shown in FIGS. 3A and 3B. Specifically, in a system in which the present position management unit 36 calculates the comprehensive positioning accuracy error in the position of the own vehicle, a one-dimensional map shown in FIG. 3A is stored in the error level determination unit 38. In this case, the error level determination unit 38 specifies the accuracy error level by referring to the one-dimensional map. On the other hand, in a system in which the present position management unit 36 separately calculates the positioning accuracy error based on the execution history of the map matching and the positioning accuracy error based on the update history of the map database 30, a two-dimensional map shown in FIG. 3B is stored in the error level determination unit 38. In this case, the present position management unit 36 specifies the accuracy error level by referring to the two-dimensional map.

After specifying the positioning accuracy error level of the own vehicle, the error level determination unit 38 transmits the information of the level to the assist control unit 14. The assist control unit 14 receives the information of the positioning accuracy error level transmitted from the error level determination unit 38 (step 150). Based on the accuracy error level, the assist control unit 14 then selects the executable control level so as to correspond to the accuracy error level from the plural output/execution patterns stored in the patterns storage unit 52 (step 152).

For example, the assist control unit 14 selects the avoidance control pattern that provides comparatively faithful vehicle driving assistance with respect to the position of the target feature, because the position of the own vehicle relative to the target feature (such as the temporary stop line and the intersection) is detected at the highest accuracy when the specified positioning accuracy error level is the smallest (level 1). On the other hand, the assist control unit 14 selects the presence information provision pattern that provides comparatively moderate vehicle driving assistance with respect to the position of the target feature, because the position of the own vehicle relative to the target feature is not detected at so high of an accuracy when the accuracy error level is the smallest (level 4).

The ECU 40 of the assist control unit 14 performs the assist control according to the control level selected as described above. In this case, the ECU 40 determines whether conditions for starting the control specified in the selected assist mode of the control level are met based on the present position of the own vehicle and the distance and time to the target feature as the control object such as the temporary stop line and the intersection supplied from the measuring unit 12 (step 156). If the conditions are met, the ECU 40 starts the assist control according to the control level (step 158).

For example, when the assist control unit 14 selects the avoidance control pattern so as to correspond to a high positioning accuracy and a small positioning accuracy error, the ECU 40 causes the brake actuator 42 to start an automatic brake when the distance from the measured position of the own vehicle to the temporary stop line as the target feature is 30 meters long and stops the vehicle at the temporary stop line. In this case, for example, the audio guidance that informs the driver of the start of the automatic brake may be performed before the automatic brake by the brake actuator 42 is started. On the other hand, when the assist control unit 14 selects the presence information provision pattern so as to correspond to a low positioning accuracy and a large positioning accuracy error, the ECU 40 causes the buzzer alarm 50 to start sounding a buzzer, an alarm output, and a speaker output when the distance from the measured position of the own vehicle to the temporary stop line as the target feature is 100 meters long and informs the driver of the presence of the temporary stop line ahead of the vehicle.

As described above, the assist control device 10 of this embodiment calculates the positioning accuracy error that fluctuates with time due to various factors when the vehicle is driving, based on the execution frequency of the map matching according to the recognition of the feature from the image picked up by the rear camera, the movement distance of the vehicle after the previous execution of the map matching, the update conditions and update frequency of the map database 30, and the elapsed time and movement distance after the previous update of the map database 30. In addition, the assist control device 10 specifies the optimum one of the accuracy error levels so as to execute the assist control with respect to the accuracy error. Then, the execution of the assist control for the assist mode according to the accuracy error level is allowed. In this respect, according to this embodiment, the control level of the assist control (such as the temporary stop control and the speed control described above) executed according to the measured position of the own vehicle is changed according to the size of the positioning accuracy error (specifically, the accuracy error level) calculated when the vehicle is driving.

The measured position of the own vehicle may not be correct if the positioning accuracy is low and the positioning accuracy error is large. Therefore, it is not appropriate to execute the assist mode (such as the avoidance control pattern) that requires the faithful control with respect to the measured position of the own vehicle. On the other hand, there is almost no problem in executing the assist mode (such as the presence information provision pattern) that does not require so severe control with respect to the measured position. Conversely, the measured position of the own vehicle may not be greatly deviated from a correct position if the positioning accuracy is high and the positioning accuracy error is small. Therefore, it is possible to execute the assist control that requires the faithful control with respect to the measured position of the own vehicle.

According to this embodiment, the assist control is executed under the control level of level 1 that requires the most faithful control with respect to the measured position when the positioning accuracy error level is the smallest in error (level 1). In addition, the assist control is executed under the control level of level 2 that requires the next most faithful control with respect to the measured position when the accuracy error level is the next smallest in error (level 2). Furthermore, the assist control is executed under the control level of level 3 that requires the next most faithful control with respect to the measured position when the accuracy error level is the next smallest in error (level 3). Moreover, the assist control is executed under the control level of level 4 that requires the least faithful control with respect to the measured position when the accuracy error level is the largest in error (level 4).

In other words, it is possible to execute the assist control such as the temporary stop control executed according to the position of the own vehicle at the control level among the plural stepwise control levels, corresponding to the accuracy error when the position of the own vehicle at the execution of the assist control is measured. In this respect, according to the assist control device 10 of this embodiment, it is possible to appropriately execute the above assist control so as to correspond to the positioning accuracy error of the own vehicle.

Furthermore, if the positioning accuracy is high and the positioning accuracy error is small, the measured position of the own vehicle is not greatly deviated from a correct position at all. Therefore, even if the start timing of the assist control is late, it is possible to prevent an unexpected situation like a case in which the own vehicle has passed the point of the target feature at the start timing. On the other hand, if the measuring accuracy is low and the positioning accuracy error is large, the measured position of the own vehicle may be greatly deviated from a correct position. Therefore, if the start timing of the assist control is late, the above unexpected situation may occur.

In order to deal with this problem, according to the assist control device 10 of this embodiment, the execution start timing of the assist modes of the assist control is different for each assist mode. In a situation in which the own vehicle approaches the target feature, the execution start timing becomes earlier in descending order of a corresponding error. In other words, the larger the positioning accuracy error is, the earlier the execution start timing of the assist modes becomes. On the other hand, the smaller the positioning accuracy error is, the later the execution start timing of the assist modes becomes. Thus, according to the assist control device 10 of this embodiment, even if the measured position of the own vehicle is greatly deviated from a correct position, it is possible to prevent the unexpected situation with the assist control executed according to the position of an object that may have a large accuracy error.

Note that in the above embodiment, the positioning unit 12 calculates the positioning accuracy error in the present position of the own vehicle based on the information of the execution history of the map matching according to the recognition of the feature from the image picked up by the rear camera and the information of the update history of the map database 30, thereby realizing "accuracy error calculation means" described in claims. In addition, the ECU 40 of the assist control unit 14 changes the control level of the assist control according to the accuracy error level so as to correspond to the accuracy error calculated as described above, thereby realizing "control level change means" described in the claims.

Meanwhile, according to the above embodiment, the comprehensive positioning accuracy error in the position of the own vehicle at the present point is calculated based on the information of the execution history of the map matching by the positioning unit 12 and the information of the update history of the map database 30, and then the control level of the assist control is changed according to the positioning accuracy error when the positioning accuracy error is calculated. As described above, the positioning accuracy error fluctuates linearly according to the previous map matching and the movement distance of the vehicle after the update of the map data. Therefore, first, the positioning accuracy error expected to be caused when the own vehicle reaches the target feature is calculated based on the measured distance and the accuracy error at the present point after the remaining distance from the own vehicle to the target feature are measured. Then, the control level of the assist control is changed according to the calculated accuracy error. In this manner, the assist control may be executed before the own vehicle reaches the target feature. Under this configuration as well, it is possible to appropriately execute the assist control having the plural stepwise control levels so as to correspond to the positioning accuracy error in the position of the own vehicle.

Furthermore, according to this embodiment, the feature and the drive lane are recognized by the use of the rear camera 32 disposed at the rear of the vehicle, but they may be recognized by the use of a front camera disposed at the front of the vehicle or recognized based on information supplied from an external infrastructure.

Furthermore, according to this embodiment, the map database 30 is installed in the vehicle. Alternatively, the vehicle may access a system provided in a certain center as occasion demands and read data stored in the map database of the center.

Furthermore, according to this embodiment, the accuracy error level is specified according to the positioning accuracy error, and then the control level of the assist control is changed according to the accuracy error level. However, the present invention is not limited to this, and the control level of the assist control may be linearly changed according to the positioning accuracy error itself. For example, in the above guidance control, the start timing of the route guidance through an audio message is linearly delayed as the positioning accuracy error is smaller.

Moreover, according to this embodiment, the temporary stop control, the intersection control, the speed control, and the guidance control are used as the assist control, but they may be applied to a system that performs other control executed according to the position of the own vehicle.

The present application is based on Japanese Priority Application No. 2006-135792, filed on May 15, 2006, the entire contents of which are hereby incorporated by reference.

The invention claimed is:

1. An assist control device of a vehicle, comprising:
a positioning unit that measures a position of the vehicle;
an assist control execution unit that executes assist control according to the position of the vehicle measured by the positioning unit;
an accuracy error calculation unit that calculates an accuracy error that is caused when the position of the vehicle is measured by the positioning unit, the accuracy error being accumulated as the vehicle moves; and
a control level change unit that changes a control level of the assist control executed by the assist control execution unit so as to correspond to the accuracy error calculated by the accuracy error calculation unit.

2. The assist control device according to claim 1, wherein the assist control has plural assist modes corresponding to the control level.

3. The assist control device according to claim 1, wherein the control level change unit expedites execution start timing of the assist control executed by the assist control execution unit when the accuracy error calculated by the accuracy error calculation unit is larger.

4. The assist control device according to claim 1, wherein the assist control performs driving assist that causes the vehicle to stop at a stop position.

5. The assist control device according to claim 1, wherein the assist control performs driving assist that prevents the vehicle from colliding into a crossing vehicle.

6. The assist control device according to claim 1, wherein the positioning unit including a dead reckoning unit that generates a driving locus of the vehicle and a map matching unit that matches map data to the driving locus to calculate the position of the vehicle, and
the accuracy error calculation unit calculates the accuracy error based on a movement distance of the vehicle after the map matching calculates the position of the vehicle based on the map data and recognition of a feature from an image picked up by a camera.

7. The assist control device according to claim 1, wherein the positioning unit including a dead reckoning unit that generates a driving locus of the vehicle and a map matching unit that matches map data to the driving locus to calculate the position of the vehicle, and
the accuracy error calculation unit calculates the accuracy error based on a movement distance of the vehicle after the map matching unit calculates the position of the vehicle based on the map data, recognition of a feature from an image picked up by a camera, and an elapsed time after an update of a map database that stores the map data.

8. The assist control device according to claim 2, wherein the control level change unit expedites execution start timing of the assist control executed by the assist control execution unit when the accuracy error calculated by the accuracy error calculation unit is larger.

9. The assist control device according to claim 2, wherein the assist control performs driving assist that causes the vehicle to stop at a stop position.

10. The assist control device according to claim 3, wherein the assist control performs driving assist that causes the vehicle to stop at a stop position.

11. The assist control device according to claim 8, wherein the assist control performs driving assist that causes the vehicle to stop at a stop position.

12. The assist control device according to claim 2, wherein the assist control performs driving assist that prevents the vehicle from colliding into a crossing vehicle.

13. The assist control device according to claim 3, wherein the assist control performs driving assist that prevents the vehicle from colliding into a crossing vehicle.

14. The assist control device according to claim 8, wherein the assist control performs driving assist that prevents the vehicle from colliding into a crossing vehicle.

15. The assist control device according to claim 1, wherein the positioning unit including a dead reckoning unit that generates a driving locus of the vehicle and a map matching unit that matches map data to the driving locus to calculate the position of the vehicle, and
the dead reckoning unit generates the driving locus based on a GPS sensor, a vehicle yaw sensor, a vehicle speed sensor, and an acceleration sensor.

16. The assist control device according to claim 1, wherein the positioning unit including a dead reckoning unit that generates a driving locus of the vehicle and a map matching unit that matches map data to the driving locus to calculate the position of the vehicle,
a camera is on a rear portion of the vehicle, and
the map matching unit corrects the position of the vehicle based on the feature recognized from the image by matching the feature to the map data.

17. An assist control device of a vehicle, comprising:
a positioning unit that measures a position of the vehicle, the positioning unit including a dead reckoning unit that generates a driving locus of the vehicle and a map matching unit that matches map data to the driving locus to calculate the position of the vehicle;
an assist control execution unit that executes assist control according to the position of the vehicle measured by the positioning unit;
an accuracy error calculation unit that calculates an accuracy error that is caused when the position of the vehicle is measured by the positioning unit, the accuracy error being accumulated as the vehicle moves; and
a control level change unit that changes a control level of the assist control executed by the assist control execution unit so as to correspond to the calculated accuracy error.

* * * * *